United States Patent [19]
Luebrecht

[11] 3,749,944
[45] July 31, 1973

[54] UNDERVOLTAGE SENSING CIRCUIT

[75] Inventor: Richard E. Luebrecht, Wapakoneta, Ohio

[73] Assignee: Westinghouse Electric Corporation, Pittsburgh, Pa.

[22] Filed: Aug. 19, 1971

[21] Appl. No.: 173,007

[52] U.S. Cl............. 307/235 R, 307/204, 307/233, 317/DIG. 5
[51] Int. Cl.......................... H02h 3/24, H03k 5/18
[58] Field of Search.................... 307/202, 233, 235, 307/204, 219, 295, 318; 317/31, DIG. 5; 328/115, 116, 117, 146, 147, 148, 149

[56] References Cited
UNITED STATES PATENTS

| | | | |
|---|---|---|---|
| 3,343,130 | 9/1967 | Petschauer et al. | 307/270 X |
| 3,480,834 | 11/1969 | Billings | 317/31 |
| 3,069,558 | 12/1962 | Burt et al. | 307/233 |
| 3,001,100 | 9/1961 | Schuh et al. | 317/31 |
| 3,243,658 | 3/1966 | Blackburn | 317/31 |
| 3,313,984 | 4/1967 | Hupp | 317/31 X |
| 3,321,754 | 5/1967 | Grimm et al. | 317/DIG. 5 |
| 3,323,071 | 5/1967 | Mitchell | 307/318 X |
| 3,340,459 | 9/1967 | Fields et al. | 307/318 X |
| 3,383,522 | 5/1968 | Apfelbeck et al. | 328/147 X |
| 3,428,864 | 2/1969 | Barber et al. | 317/31 |
| 3,535,591 | 10/1970 | Holmquest | 317/31 X |
| 3,571,657 | 3/1971 | Domann | 317/31 X |

Primary Examiner—John W. Huckert
Assistant Examiner—L. N. Anagnos
Attorney—A. T. Stratton and Gordon H. Telfer

[57] ABSTRACT

A circuit is provided to sense the occurrence of an undervoltage on any one or more phases of an AC electrical system. The phase voltages are compared with a reference level with charging of a capacitive means occurring for the duration of any undervoltage, even for part of normal phase voltage wave forms. If the level to which the capacitive means is charged exceeds another reference level, an output signal is created for indicating the undervoltage condition has existed beyond a tolerable limit. The nature of the circuit's operation is inherently frequency sensitive so that occurrence of underfrequency phase voltages is also detected.

4 Claims, 4 Drawing Figures

PATENTED JUL 31 1973 3,749,944

UNDERVOLTAGE SENSING CIRCUIT

BACKGROUND OF THE INVENTION

1. Field of the Invention

The invention relates to undervoltage sensing circuits.

2. Prior Art of the Invention

Undervoltage sensing circuits are often used in electrical systems to provide operating protection for system components. Among the relevant prior art are Schuh et al. Pat. No. 3,001,100 and Apfelbeck et al. Pat. No. 3,383,522. In the circuits of these patents a resistance voltage divider is connected from each phase to ground and a diode circuit is connected from each of the voltage dividers to an output switch. The combined effect of the diode circuits is to act as an AND circuit. If one of the phase voltages drops to a predetermined level, its associated diode circuit conducts to ground, and an output signal is produced for operating a control circuit or otherwise indicating an undervoltage.

In polyphase systems, an undervoltage on all three phases produces the indicating output signal more rapidly than the same undervoltage on a single phase, so that is has been desired to avoid this effect in some cases by employing an improvement disclosed in the Apfelbeck et al. patent. There the resistance voltage dividers are connected in a three phase ungrounded network such as a wye or delta configuration to permit a minimization of the difference between the three phase dropout voltage and the single phase dropout voltage. These circuits require a number of components that is undesirably large in some applications, and it was in an effort to provide at least equivalent operating capability with a simpler and less costly circuit that the present invention came about.

SUMMARY OF THE INVENTION

In accordance with the present invention, signals proportional to the magnitude of each of the phase voltages are applied at a common point. These signals may be half-wave rectified phase voltages. The voltage level at the common point is compared with a reference level, such as may be set by a zener diode, with the result that a capacitive means is charged for the duration of any undervoltage. In the case of the use of half-wave rectified phase voltages, the capacitive means is charged for part of the normal phase voltages, but at the peak of the normal phase voltages the capacitive means charging circuit is not operative. When an undervoltage occurs, the charging path is operative for a longer duration that permits the level to which the capacitive means charges to exceed another reference level, such as may be set by another zener diode, to produce an output signal for indicating the undervoltage condition exists and which may be used to indicate that condition or to initiate a correction. Because of the reliance upon the charging duration of the capacitive means as a key element of this circuit, it is also frequency sensitive and hence indicates the occurrence of an underfrequency phase voltage even though the magnitude of the phase voltages may be within limits.

DESCRIPTION OF THE PREFERRED EMBODIMENTS

Figure 1:
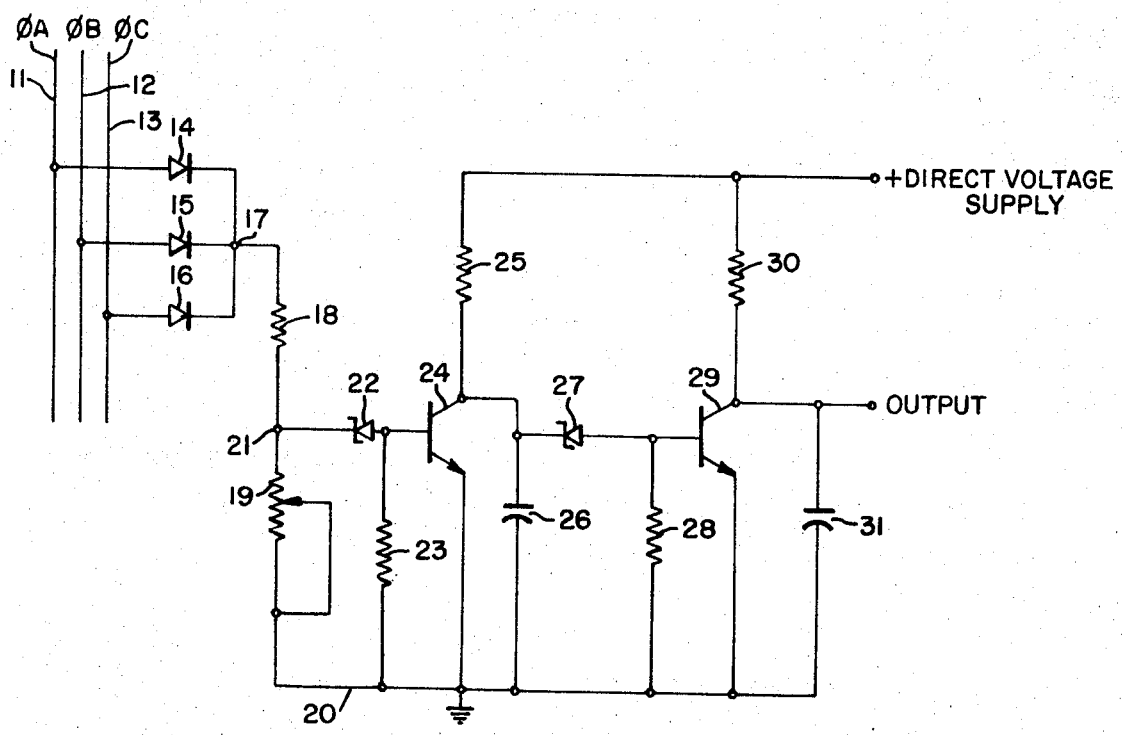
FIG. 1 is a circuit schematic of one embodiment of the present invention.

Referring to FIG. 1, a circuit is shown to indicate undervoltage conditions in a polyphase electrical system of three phases, phases A, B and C, on lines 11, 12 and 13, respectively. Like poled diodes 14, 15 and 16 are respectively connected to lines 11, 12 and 13 and to a common point 17. A resistive voltage divider consisting of a resistor 18 and a variable resistor 19 are connected between common point 17 and line 20, which is at a common reference potential or ground. Point 21 between resistors 18 and 19 is connected to a reverse poled zener diode 22, whose anode is connectd to ground through resistor 23 and also to the base of a transistor 24, NPN in this example.

The collector of transistor 24 is connected through resistor 25 to a regulated direct voltage supply. The emitter of transistor 24 is connected to ground. The collector of transistor 24 is also connected to ground through a capacitor 26 and to the cathode side of an additional zener diode 27 whose anode is connected to ground through resistor 28 and is also connected to the base of transistor 29, which is also an NPN transistor in this example. The emitter of transistor 29 is connected to ground. The collector of transistor 29 is connected to the direct voltage supply through resistor 30 and is also connected to an output terminal. The output terminal has capacitor 31 between it and the ground line 20.

The circuit is described for application to a three phase system, although it will be understood that corresponding circuits may be formed for systems of other numbers of phases of one or more, although its principal advantages are in polyphase systems.

The three phase AC voltage on lines 11, 12 and 13 is rectified by the diodes 14, 15 and 16, respectively. The voltage divider comprising resistors 18 and 19 establishes the operating level of the circuit so that at point 21 there is a voltage in accordance with the magnitude of the phase voltages. With normal voltages on lines 11, 12 and 13 the peaks of the half-rectified wave forms are high enough to cause current flow through zener diode 22 to turn on transistor 24 for a portion of each phase voltage half cycle. In the absence of transistor 24 being turned on, even during a portion of each phase voltage half cycle, as would normally occur, a charging path from the DC supply through resistor 25 charges capacitor 26. However, capacitor 26 discharges each time transistor 24 conducts.

The charging and discharging of capacitor 26 during operation with normal phase voltages is insufficient to cause the voltage to which capacitor 26 is charged to exceed the breakdown level of zener diode 27. However, when any one phase voltage drops below a predetermined level, transistor 24 is nonconducting for a longer duration, causing capacitor 26 to charge to a higher level that can exceed the breakdown voltage of diode 27. Upon that occurrence, current then flows through diode 27 to the base of transistor 29, causing transistor 29 to conduct. The time constant of capacitor 31 which is connected from the collector of transistor 29 to ground holds the voltage level at capacitor 31 low during the nonconduction portion of the operation of transistor 29. Therefore, an undervoltage condition on even one phase that exceeds the predetermined limits results in an indication by change of state of the output of transistor 29.

When all three phases of the three phase system go below the desired operating level, the peak voltage at the cathode of zener diode 22, at point 21, is low and there is no current flow to the base of transistor 24. Therefore, capacitor 26 charges to a relatively high level and transistor 29 turns on to give the undervoltage signal.

The nature of the circuit is such that it is not necessary to employ a type of ungrounded network configuration for a resistance voltage divider at the input from each phase. Circuits in accordance with this invention are frequency dependent but are operative within the normal operating frequency range desired for practical systems such as aircraft electrical systems. An inherent advantage of the system is that it also permits detection of underfrequency conditions because of the time duration effect on the charging of capacitor 26 of a voltage, regardless of magnitude, that occurs for less than a prescribed period.

Figure 2A:
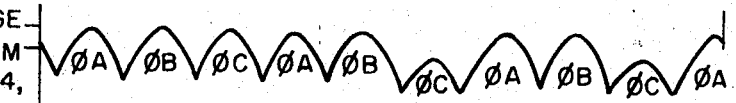
FIGS. 2A, 2B, and 2C are wave forms illustrative of the operation of circuits in accordance with the present invention.

Referring to FIG. 2A, wave forms are shown for the phase voltages where phases A and B are of normal magnitude, while phase C has an undervoltage occurring about halfway through the illustrated wave forms. For example, the normal peak voltages may be about 115 volts while the undervoltage condition illustrated for phase C, and which is desirably detected, may be of about 100 volts.

Figure 2B:
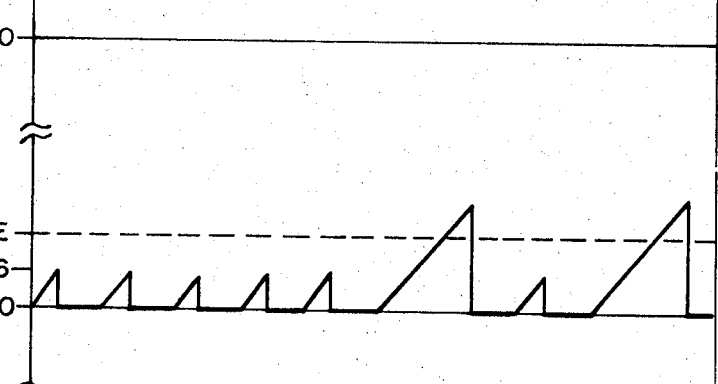

In FIG. 2B there is illustrated a level at which the zener diode 27 becomes conducting and also the voltages occurring at capacitor 26 resulting from its charging during the off periods for transistor 24. It can be seen that during the normal periods of operation the charging voltage of capacitor 26 is appreciably below the breakdown voltage for zener diode 27. However, upon the occurrence of an undervoltage which is to be detected, capacitor 26 charges to a level that exceeds the breakdown voltage.

Figure 2C:
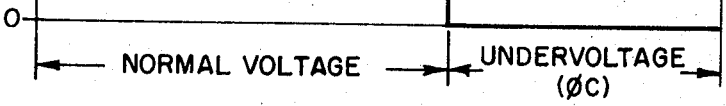

In FIG. 2C is illustrated the voltage at the capacitor 31 or the output voltage which varies between levels in accordance with the occurrence of the undervoltage condition. An undervoltage on a single phase, such as phase C, results in a marked lowering of the output voltage condition which is held at the low level, even though intervening phases A and B are of normal magnitude, by capacitor 31 which is selected for a long time constant relative to the individual phase periods.

The following table of suitable elements for the circuit of FIG. 1 is presented merely by way of further example.

| | |
|---|---|
| Phase voltages A, B, C | 115 v., 400 Hz. Nominal |
| Direct Voltage Supply | 15 v. DC, regulated |
| Diodes 14, 15, 16 | 1N4005 |
| Resistor 18 | 60.4 K ohms, ± 1% |
| Resistor 19 | 10 K ohms, ± 1% |
| Zener diode 22 | 6.8v., ± 5% |
| Resistors 23 and 28 | 47 K ohms, ± 5% |
| Transistors 24 and 29 | 2N2219 |
| Resistor 25 | 20 K ohms, ± 1% |
| Capacitor 26 | 0.047 microf., ± 10% |
| Zener diode 27 | 8.2v., ± 5% |
| Resistor 30 | 20 K ohms, ± 5% |
| Capacitor 31 | 1 microf., 35v., ± 10% |

This circuit was designed to provide an undervoltage output signal at 100 volts. In actual operation the following results were obtained:

| Ambient Temperature | Voltage Operation 30* | 10* | Underfrequency Operation |
|---|---|---|---|
| 25° C | 100.2 v. | 99.8 v. | 190 Hz. |
| −55° C | 99.7 v. | 99.1 v. | 178 Hz. |
| +75° C | 100.4 v. | 100.1 v. | 197 Hz. |

*Undervoltage operation substantially uniform from 350 to 450 Hz.

I claim:

1. An undervoltage sensing circuit for an electrical system of one or more electrical phases comprising:
   means to apply signals proportional to the magnitude of each phase voltage of the electrical system at a common point;
   first means responsive to voltage at said common point to conduct only when said voltage is above a first predetermined level normally occurring during a portion of each phase voltage half cycle;
   first means responsive to current conducted through said voltage responsive means to turn off a charging circuit path only when said voltage is above said first predetermined level;
   capacitive means charged by said charging circuit for a period proportional to the time during which said voltage is below said first predetermined level;
   second means responsive to voltage to which said capacitive means charges to conduct only when said capacitor voltage is above a second predetermined level indicative of said capacitor charging through at least one entire phase half cycle; and
   second means responsive to current conducted through said second voltage responsive means to close a current path to an output terminal and to discharge an additional capacitive means.

2. The subject matter of claim 1 wherein:
   said means to apply signals proportional to the magnitude of said phase voltages comprises a half-wave rectifier connected between each phase conductor of said system and said common point.

3. The subject matter of claim 1 wherein:
   said first and second means responsive to voltage are each a zener diode and said first and second means responsive to current are each transistors.

4. The subject matter of claim 1 wherein:
   said system is a polyphase system and said additional capacitive means is such as to have a time constant that is long compared with each phase period.

* * * * *